United States Patent
Hsieh et al.

(10) Patent No.: US 8,456,837 B2
(45) Date of Patent: Jun. 4, 2013

(54) COMPUTER ENCLOSURE

(75) Inventors: Kun-Chi Hsieh, Tu-Cheng (TW); Li Tong, Shenzhen (CN); Jun-Zhi Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 267 days.

(21) Appl. No.: 13/087,651

(22) Filed: Apr. 15, 2011

(65) Prior Publication Data
US 2012/0075786 A1   Mar. 29, 2012

(30) Foreign Application Priority Data

Sep. 27, 2010   (CN) .......................... 2010 1 0293555

(51) Int. Cl.
*G06F 1/16*   (2006.01)
(52) U.S. Cl.
USPC ............ 361/679.6; 361/679.02; 361/724; 361/752; 362/551; 362/555; 200/313; 200/314

(58) Field of Classification Search
USPC ...................................... 361/679.6
See application file for complete search history.

(56) References Cited

U.S. PATENT DOCUMENTS

| | | | | |
|---|---|---|---|---|
| 5,455,743 A | * | 10/1995 | Miyajima | 361/781 |
| 5,813,520 A | * | 9/1998 | Reier et al. | 200/343 |
| 6,275,387 B1 | * | 8/2001 | Liao et al. | 361/806 |
| 2002/0041484 A1 | * | 4/2002 | Lajara et al. | 361/687 |
| 2007/0187218 A1 | * | 8/2007 | Chen et al. | 200/296 |

* cited by examiner

*Primary Examiner* — Anthony Q Edwards
(74) *Attorney, Agent, or Firm* — Altis Law Group, Inc.

(57) ABSTRACT

A computer enclosure includes a front panel, a switch module attached to the front panel, and a light guide block. The front panel includes a front plate and a top flange connected to the front plate. A holding slot is defined on the top flange for accommodating the light guide block. The switch module includes a mounting bracket and a first light emitting diode (LED) attached to the mounting bracket. The first LED faces one end of the light guide block and generates light that enters the light guide block and emits from the front panel.

20 Claims, 7 Drawing Sheets

COMPUTER ENCLOSURE

BACKGROUND

1. Technical Field

The present disclosure relates to computer enclosures, more particularly to a computer enclosure with a light guide block.

2. Description of Related Art

Computer enclosures usually include a front panel, a switch button attached to the front panel, and a light emitting diode (LED) attached to the front panel. The switch button includes a transparent portion. The LED locates behind the transparent portion. After the switch button is pressed to power on the computer, the LED is powered on and emits light via the transparent portion of the switch button to indicate that the computer is powered on. However, light emitted from the LED can only emit out from the switch button. The indicating effect is not very obvious.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
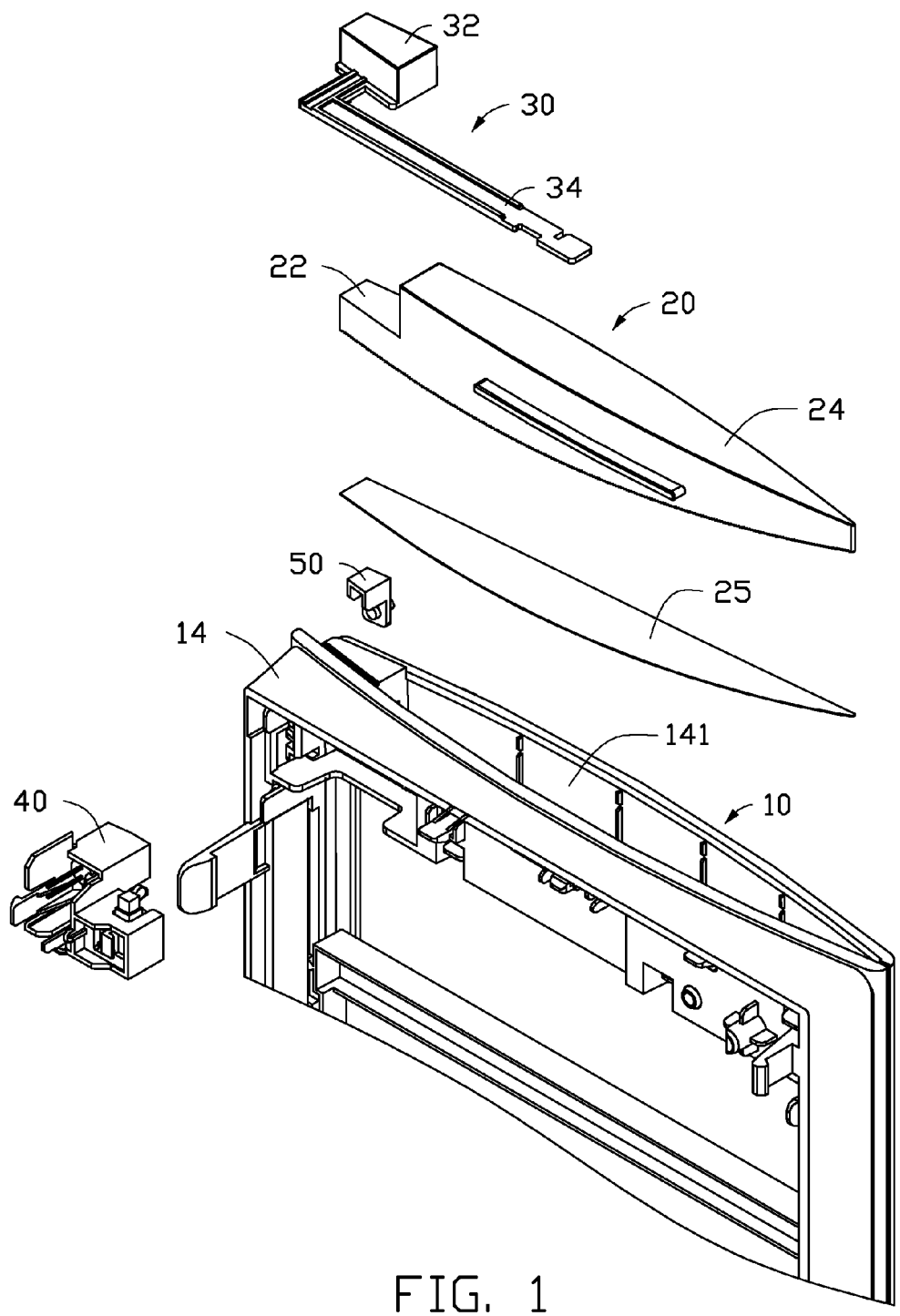
FIG. 1 is an exploded view of a computer enclosure according to an embodiment.
Figure 2:
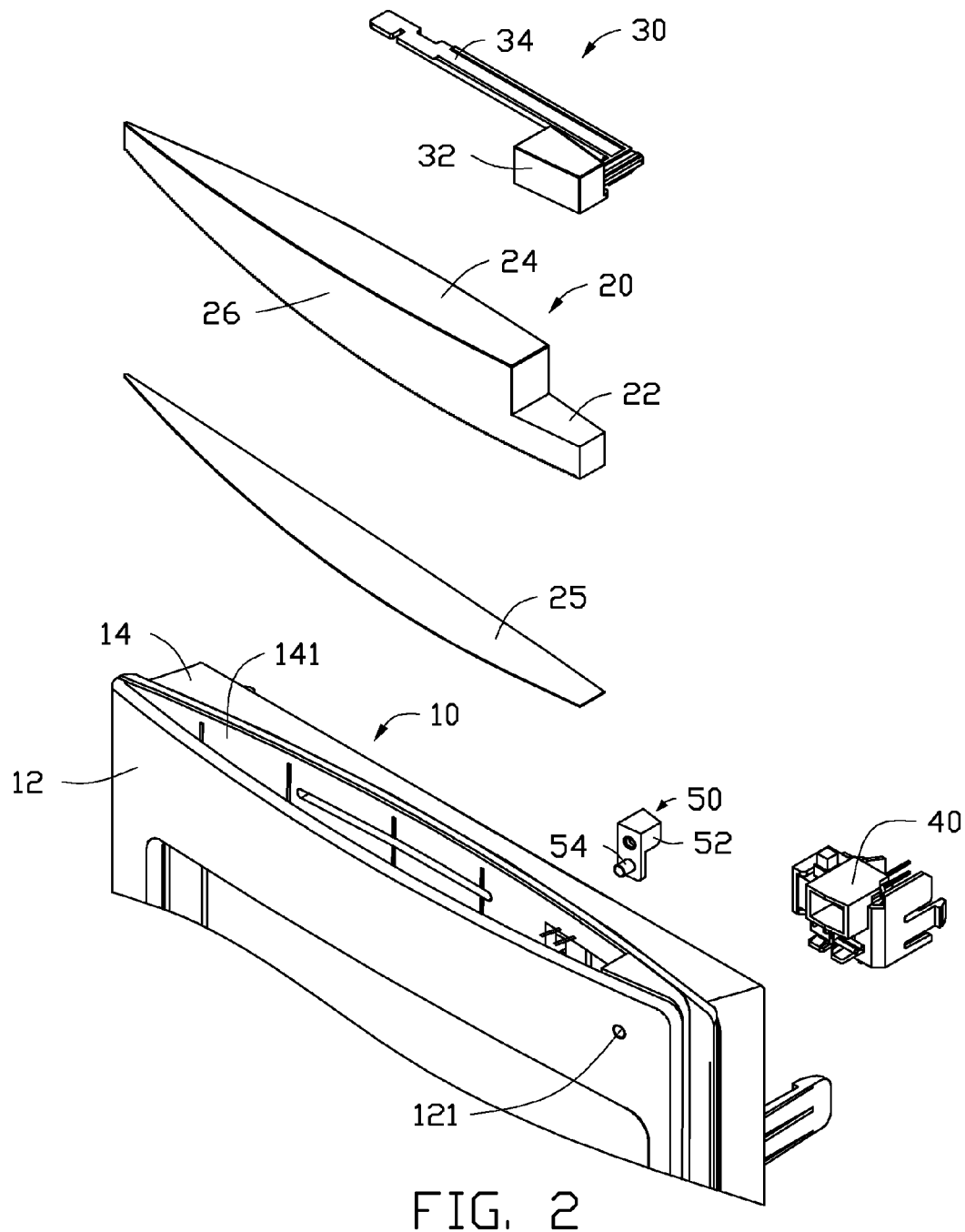
FIG. 2 is similar to FIG. 1, but viewed from another aspect.

Referring to FIGS. 1 and 2, an embodiment of a computer enclosure includes a front panel 10, a light guide block 20, a light reflecting board 25, a pressable member 30, a switch module 40, and a transparent member 50. The front panel 10 includes a front plate 12 and a top flange 14 connected to the front plate 12. A mounting hole 121 is defined in the front plate 12. An elongate holding slot 141 is defined in the top flange 14. The pressable member 30 includes a pressing portion 32 and an L-shaped resilient arm 34 connected to the pressing portion 32. The transparent member 50 includes a main portion 52 with an L shape and a transparent post 54 protruding from the main portion 52. The light guide block 20 is solid and made of light conductive material. A first end of the light guide block 20 is cuspate. A gap 22 is defined in an upper portion of a second end of the light guide block 20. The light guide block 20 includes a top surface 24, a pair of side surfaces 26 connected to opposite sides of the top surface 24, and a base surface (not labeled) located between the pair of side surfaces 26. A shape and size of the light reflecting board 25 is the same as that of the base surface of the light guide block 20.

Figure 3:
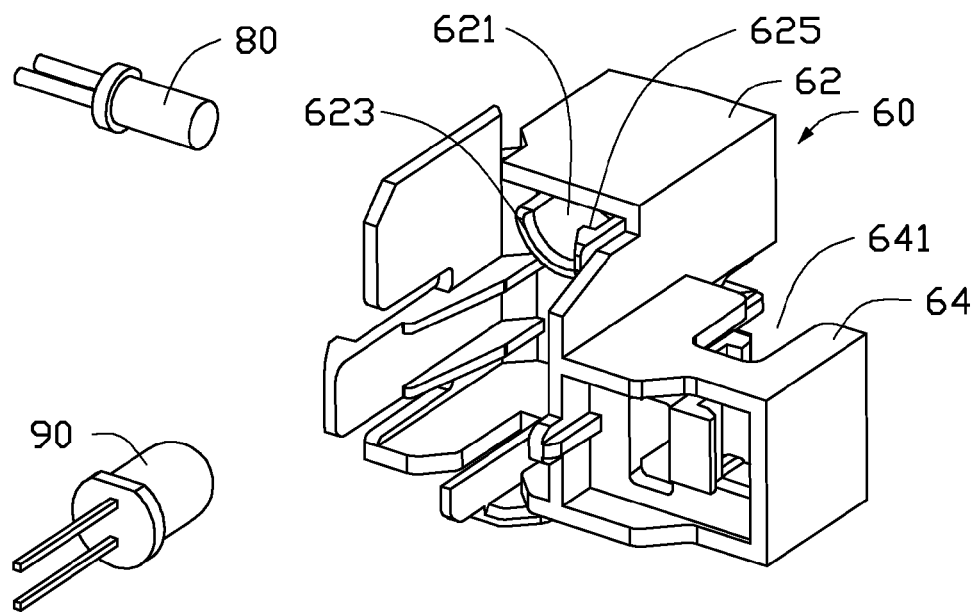
FIG. 3 is an exploded view of a switch module of FIG. 1.
Figure 3:
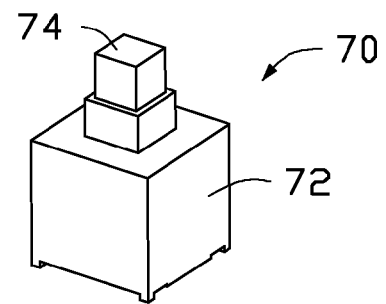
Figure 4:
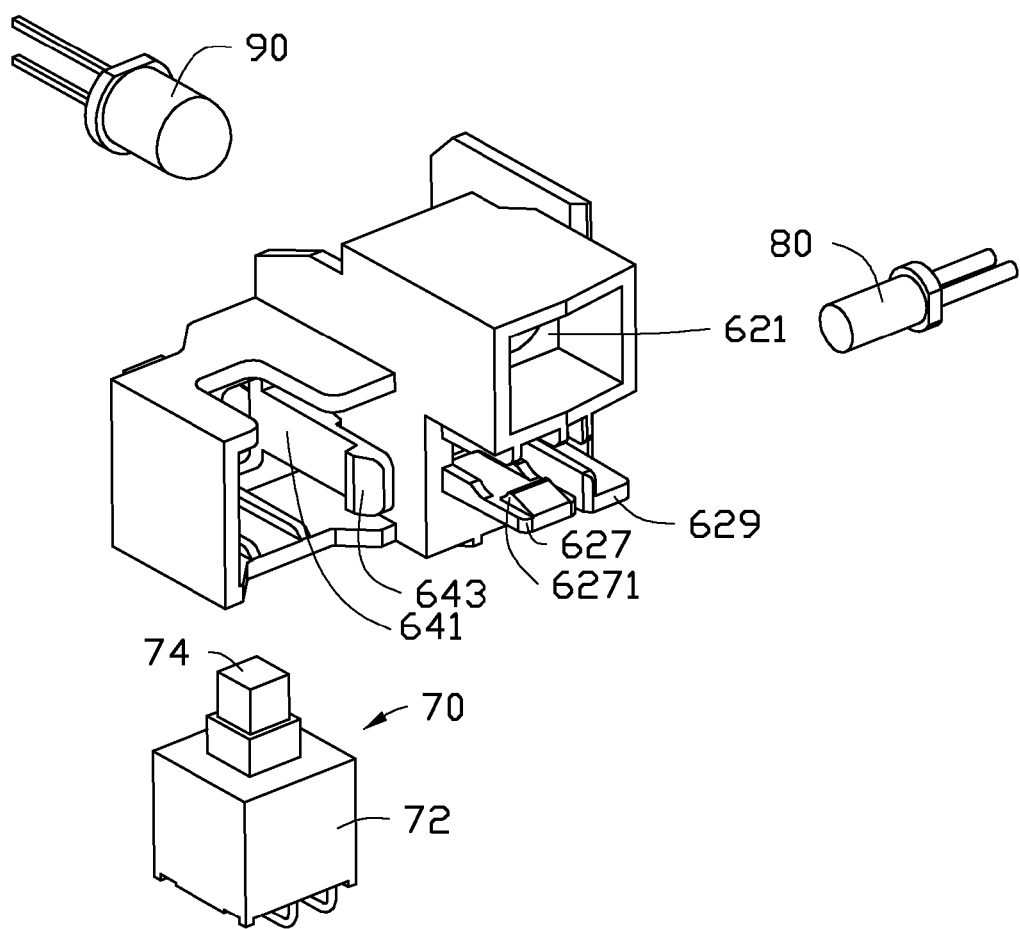
FIG. 4 is similar to FIG. 3, but viewed from another aspect.

Referring to FIGS. 3 and 4, the switch module 40 includes a mounting bracket 60, a switch member 70, a first LED 80, and a second LED 90. The mounting bracket 60 includes a first portion 62, configured for mounting the first LED 80 and the second LED 90, and a second portion 64 configured for mounting the switch member 70. The first portion 62 and the second portion 64 are joined side by side. A height of the first portion 62 is greater than that of the second portion 64. A first mounting slot 621 is defined in the first portion 62 for accommodating the second LED 90. A holding piece 623 with an arc-shape protrudes from an edge of the first mounting slot 621 towards a rear side of the first portion 62. A first hook piece 625 protrudes from the rear side and is located adjacent to the first mounting slot 621. The mounting bracket 60 further includes a first support piece 627 and a second support piece 629 protruding from a front side of the mounting bracket 60 (See FIG. 4). A wedge-shaped protrusion 6271 is formed on a distal end of the first support piece 627. A second mounting slot 641 is defined in the second portion 64. A second hook piece 643 extends from the second portion 64 towards the front side. The switch member 70 includes a main body 72 and a switch button 74 attached to the main body 72.

Figure 5:
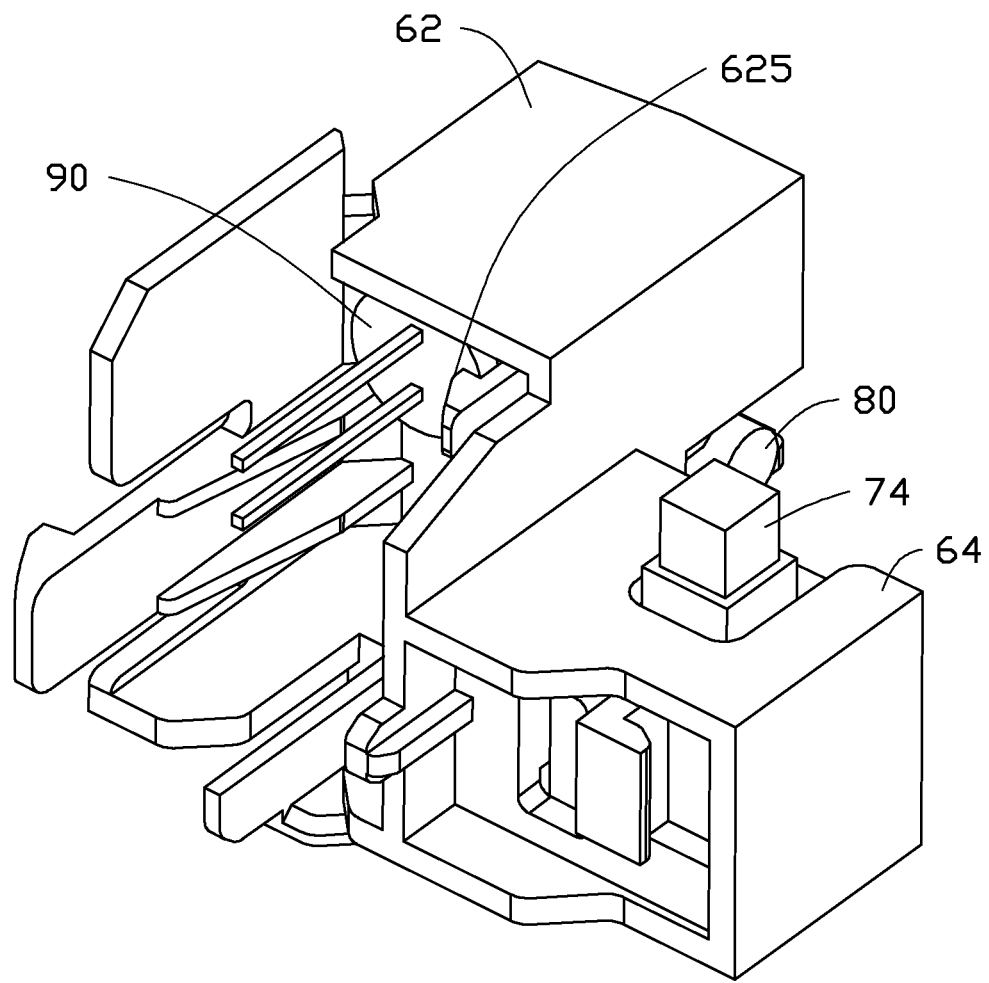
FIG. 5 is an assembled view of FIG. 3.
Figure 6:
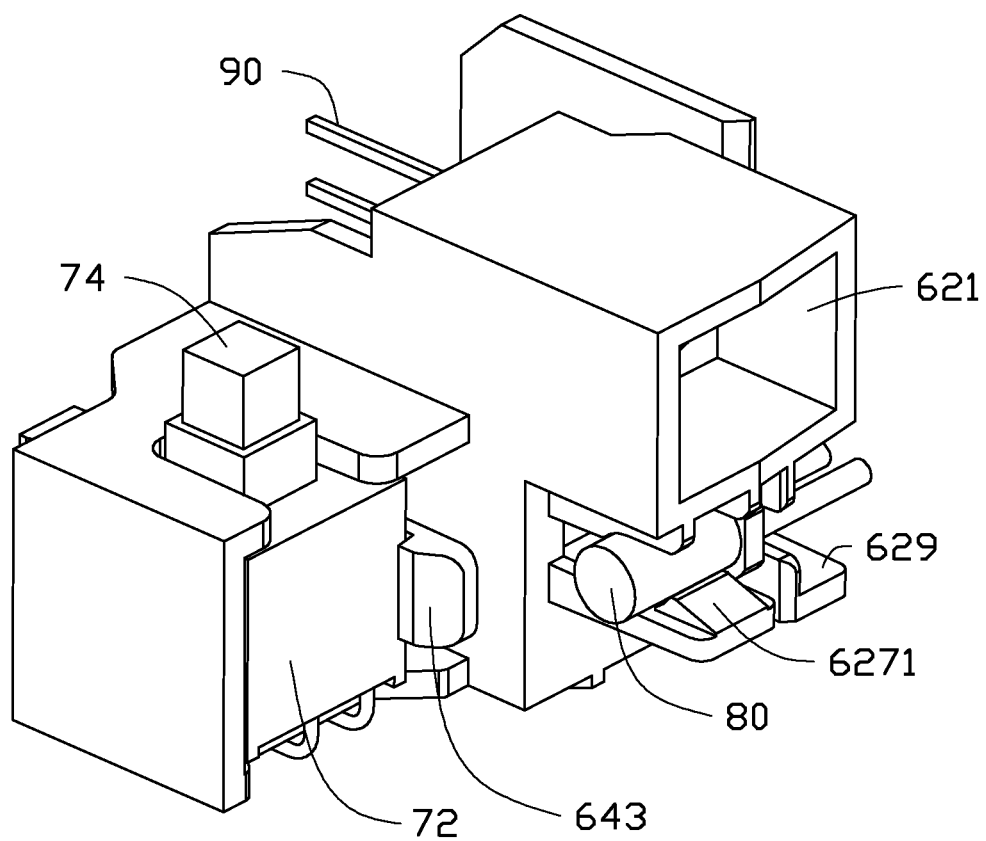
FIG. 6 is an assembled view of FIG. 4.

Referring to FIGS. 5 and 6, in assembly of the switch module 40, the main body 72 is mounted in the second mounting slot 641. The second hook piece 643 clasps the main body 72 to secure the switch member 70 in the second mounting slot 641. The switch button 74 extends through a top gap of the second portion 64. The second LED 90 is mounted in the first mounting slot 621 and is supported by the holding piece 623. The first hook piece 625 clasps a rear side of the second LED 90 to secure the second LED 90 in the first mounting slot 621. The first LED 80 is held by the first support piece 627 and the second support piece 629. The wedge-shaped protrusion 6271 abuts against the first LED 80 and prevents the first LED 80 from sliding off the mounting bracket 60 (see FIG. 6).

Figure 7:
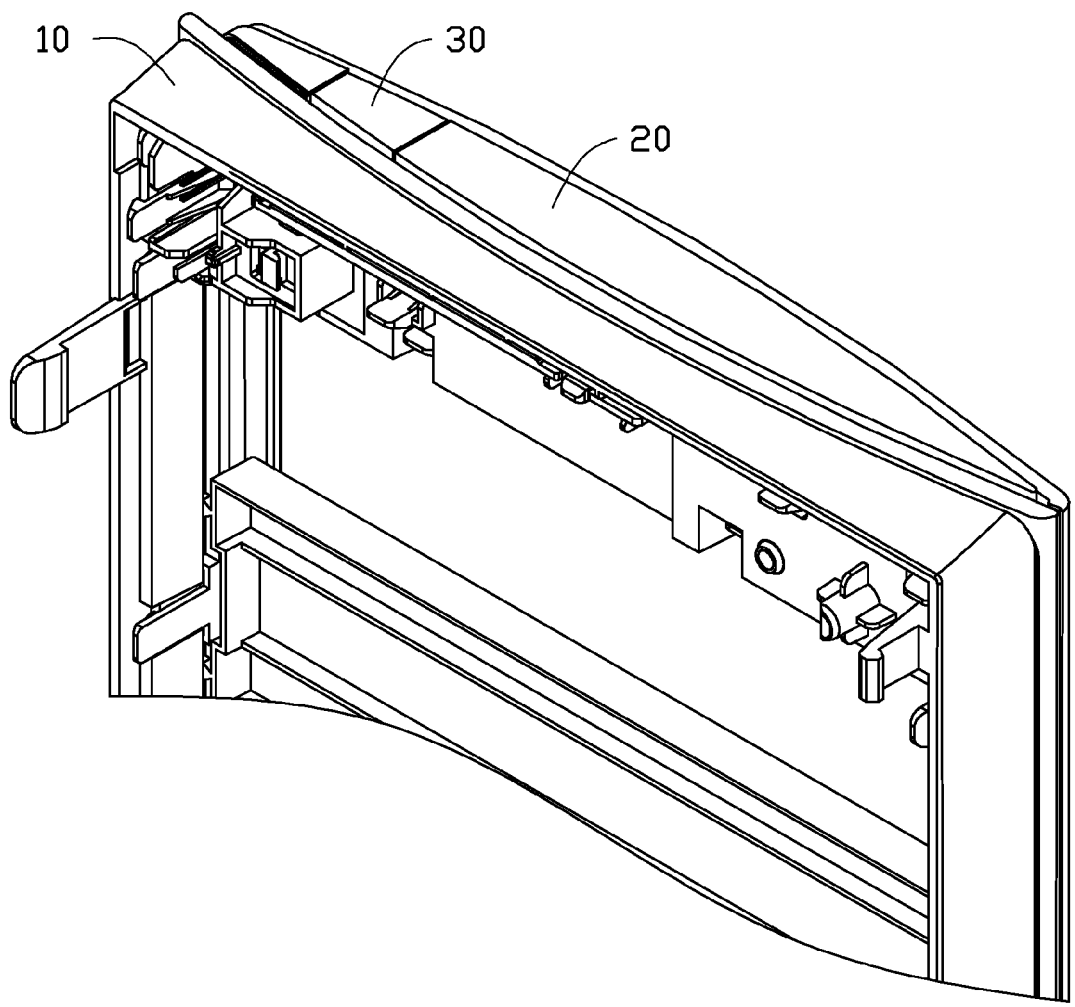
FIG. 7 is an assembled view of FIG. 1.

Referring to FIG. 7, in assembly of the computer enclosure, the light reflecting board 25 is secured to the base surface of the light guide block 20. The pressable member 30 and the light guide block 20 with the light reflecting board 25 are mounted in the holding slot 141. The pressing portion 32 is received in the gap 22 and is movable along a vertical direction in the gap 22. A free end of the resilient arm 34 is secured to the front panel 10. The transparent post 54 is mounted in the mounting hole 121. The main portion 52 is secured to an inner side of the front panel 10. The switch module 40 is secured to the inner side of the front panel 10 at a position where the second LED 90 faces the transparent post 54 and the first LED 80 faces the second end of the light guide block 20. The switch button 74 abuts against a lower side of a corner of the resilient arm 34. After the pressing portion 32 is pressed, the resilient arm 34 is deformed and urges the switch button 74 to power on the computer. The first LED 80 is lit and generates light that enters the light guide block 20 and emits out from the light guide block 20 along an upward direction. The second LED 90 is also lit and generates light that emits from the transparent post 54 along the horizontal direction. The light reflecting board 25 under the light guide block 20 can help light to be reflected upward and enhances the indication effect.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer enclosure comprising:
   a front panel;
   a switch module, attached to the front panel, comprising a mounting bracket, a switch member attached to the mounting bracket, and a first light emitting diode (LED) attached to the mounting bracket; and
   a light guide block attached to the front panel;
   wherein the first LED faces a distal end of the light guide block and is configured to generate light that enters in the light guide block and propagates out from the front panel when the switch member is turned on.

2. The computer enclosure of claim 1, further comprising a light reflecting board attached to a base of the light guide block.

3. The computer enclosure of claim 2, wherein a gap is defined in the distal end of the light guide block.

4. The computer enclosure of claim 3, further comprising a pressable member abutting against the switch member, wherein the pressable member comprises a pressing portion mounted in the gap and a resilient arm connected to the pressing portion, and a free end of the resilient arm is secured to the front panel.

5. The computer enclosure of claim 4, wherein the resilient arm is L-shaped.

6. The computer enclosure of claim 1, wherein the mounting bracket comprises a first portion and a second portion, the first LED is attached to a front side of the first portion, and the switch member is mounted in the second portion.

7. The computer enclosure of claim 6, wherein the switch module further comprises a second LED, a first mounting slot is defined in the first portion with the second LED mounted therein, and a second mounting slot is defined in the second portion with the switch member mounted therein.

8. The computer enclosure of claim 7, wherein an arc-shaped holding piece extends from an edge of the first mounting slot, and the second LED is received in the first mounting slot and held by the arc-shaped holding piece.

9. The computer enclosure of claim 7, wherein a first hook piece, located adjacent to the first mounting slot, protrudes from the first portion, clasps the second LED; and a second hook piece, extends from the second portion, clasps the switch member.

10. The computer enclosure of claim 7, wherein a first support piece and a second support piece extend from the first portion towards a front side of the mounting bracket, and the first LED is held by the first support piece and the second support piece.

11. A computer enclosure comprising:
    a front panel comprising a front plate and a top flange connected to the front plate, a holding slot being defined on the top flange;
    a switch module, attached to the front panel, comprising a mounting bracket and a first light emitting diode (LED) attached to the mounting bracket; and
    a light guide block mounted in the holding slot;
    wherein the first LED faces a distal end of the light guide block and is configured to generate light that enters in the light guide block and propagates out from the front panel.

12. The computer enclosure of claim 11, further comprising a light reflecting board attached to a base of the light guide block.

13. The computer enclosure of claim 12, wherein a gap is defined in the distal end of the light guide block.

14. The computer enclosure of claim 13, further comprising a pressable member, wherein the switch module further comprises a switch member attached to the mounting bracket, and the pressable member abuts against the switch member.

15. The computer enclosure of claim 14, wherein the pressable member comprises a pressing portion mounted in the gap and a resilient arm connected to the pressing portion, and a free end of the resilient arm is secured to the front panel.

16. The computer enclosure of claim 14, wherein the mounting bracket comprises a first portion and a second portion, the first LED is attached to a front side of the first portion, and the switch member is mounted in the second portion.

17. The computer enclosure of claim 16, wherein the switch module further comprises a second LED, a first mounting slot is defined in the first portion with the second LED mounted therein, and a second mounting slot is defined in the second portion with the switch member mounted therein.

18. The computer enclosure of claim 17, wherein an arc-shaped holding piece extends from an edge of the first mounting slot, and the second LED is received in the first mounting slot and held by the arc-shaped holding piece.

19. The computer enclosure of claim 17, wherein a first hook piece located adjacent to the first mounting slot protrudes from the first portion for clasping the second LED, and a second hook piece extends from the second portion for clasping the switch member.

20. The computer enclosure of claim 17, wherein a first support piece and a second support piece extend from the first portion towards a front side of the mounting bracket, and the first LED is held by the first support piece and the second support piece.

* * * * *